(12) United States Patent
Gee

(10) Patent No.: US 12,108,847 B1
(45) Date of Patent: Oct. 8, 2024

(54) ADAPTER PANEL FOR MOLLE PALS AND HOOK AND LOOP ORGANIZATION SYSTEMS

(71) Applicant: Garrett Gee, Santa Ana, CA (US)

(72) Inventor: Garrett Gee, Santa Ana, CA (US)

(73) Assignee: Godai Group LLC, Santa Ana, CA (US)

( * ) Notice: Subject to any disclaimer, the term of this patent is extended or adjusted under 35 U.S.C. 154(b) by 0 days.

(21) Appl. No.: 18/202,244

(22) Filed: May 25, 2023

Related U.S. Application Data

(60) Provisional application No. 63/345,812, filed on May 25, 2022.

(51) Int. Cl.
  *A44B 13/00* (2006.01)
  *A45F 5/02* (2006.01)
  *F16M 13/02* (2006.01)

(52) U.S. Cl.
  CPC ............ *A44B 13/0076* (2013.01); *A45F 5/02* (2013.01); *F16M 13/02* (2013.01)

(58) Field of Classification Search
  CPC ........ A44B 13/0076; A45F 5/02; F16M 13/02
  See application file for complete search history.

(56) References Cited

U.S. PATENT DOCUMENTS

| | | | |
|---|---|---|---|
| 7,455,274 B2 * | 11/2008 | Sutherland | B60R 7/02 248/505 |
| 9,144,255 B1 * | 9/2015 | Perciballi | A41D 27/00 |
| 9,521,897 B2 * | 12/2016 | Thompson | A45F 5/02 |
| 10,264,874 B2 * | 4/2019 | Becker | A45F 3/14 |
| 11,940,092 B1 * | 3/2024 | Foutz | B60R 7/043 |
| 11,974,643 B2 * | 5/2024 | Gee | A45C 13/30 |
| 2013/0193179 A1 * | 8/2013 | Davidson | B60R 7/043 224/584 |
| 2017/0127812 A1 * | 5/2017 | Alcantra | F41C 33/046 |

* cited by examiner

*Primary Examiner* — Anita M King
(74) *Attorney, Agent, or Firm* — Plager Schack LLP; Mark H. Plager, Esq.; Naomi Mann, Esq.

(57) ABSTRACT

Disclosed is an adapter panel which can be used for converting a MOLLE/PALS strap ladder surface to a hook-and-loop surface, as well as a hook-and-loop surface to MOLLE/PALS strap ladder surface. In some embodiments, the disclosed adapter panel may retain the functionality of the original system while adding the functionality of the second system. In some further embodiments, the adapter panel may be used as a stand-alone organizational system.

13 Claims, 5 Drawing Sheets

ADAPTER PANEL FOR MOLLE PALS AND HOOK AND LOOP ORGANIZATION SYSTEMS

RELATED APPLICATION

This application claims benefit to U.S. Non-Provisional Application No. 63/345,812 filed May 25, 2022, which is incorporated by reference herein in its entirety.

BACKGROUND

The present disclosure relates generally to organization systems.

Various types of organizational systems including hook-and-loop and MOLLE/PALS systems may be used for outdoor gears, tool bags, storage, luggage, and the like. In many cases, a consumer may own different types of such systems. As such, an improved method which enables consumers to combine the different types of systems is desirable.

SUMMARY

According to various embodiments, disclosed is an adapter panel which can be used for converting a MOLLE/PALS strap ladder surface to a hook-and-loop surface, as well as a hook-and-loop surface to MOLLE/PALS strap ladder surface. In further embodiments, the disclosed adapter panel may retain the functionality of the original system while adding the functionality of the second system. In some further embodiments, the adapter panel may be used as a stand-alone organizational system.

According to various embodiments, the disclosed adapter panel may comprise a panel front side comprising a hook and/or loop layer; a panel back side comprising a hook and/or loop layer; and multiple cutouts within the panel, the cutouts having cross-axial shapes that include both a vertical axis and a horizontal axis for strap insertion. In some embodiments, the adapter panel may further comprise a rigid center layer sandwiched between the hook and/or loop layers of the front and back panel sides.

According to various embodiments, disclosed is a strap connection panel comprising a planar sheet, the planar sheet including at least one sheet layer and having a front planar surface and a back planar surface opposite the front planar surface, wherein the front planar surface and the back planar surface comprise hook-and-loop material, and wherein the planar sheet includes at least one cutout configured for receiving a flat strap through the planar sheet. The strap connection panel may be an adapter panel configured to adapt a hook-and-loop system to a MOLLE strap system and to adapt a MOLLE strap system to a hook-and-loop system.

In some embodiments, the planar sheet is rigid. In certain embodiments, the cutout comprises at least one linear slit. In further embodiments, the cutout comprises multiple linear slits oriented in different directions and configured to allow the flat strap to be received in different alternate orientations with respect to the strap connection panel. In some embodiments, the cutout comprises cross-axial linear slits. In some embodiments, the planar sheet comprises multiple cutouts. In certain embodiments, the multiple cutouts have at least 2 different shapes. In certain embodiments, the multiple cutouts include at least one row and/or at least one column of multiple linear slits aligned in a common direction. In certain embodiments, the multiple cutouts include multiple vertical cutouts which are aligned with respect to one another, and multiple horizontal cutouts which are aligned with respect to one another. In some embodiments, the front planar surface comprises a hook component of the hook-and-loop material, and the back planar surface comprises a loop component of the hook-and-loop material. In some embodiments, the front planar surface and the back planar surface both comprise a hook component of the hook-and-loop material, or wherein the front planar surface and the back planar surface both comprise a loop component of the hook-and-loop material.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Organizational systems such as Hook-and-loop and MOLLE (Modular Lightweight Load-carrying Equipment)/PALS (Pouch Attachment Ladder System) include attachment modules configured to permit attachment of various items to a main attachment product. The main attachment product may be for example, a carrying bag, case, wall panel, and the like. Typically, such systems are compatible with attachment items intended for the specific type of system. For example, a hook-and-loop system would allow for attachment of items that include hook-and-loop attachment element(s) (e.g., VELCRO® fabric material). A MOLLE/PALS system would likewise allow for attachment of items incorporating a MOLLE/PALS style strap(s). Adapters are available for converting one type of organizational system to another type of organizational system. However, such adapters are limited in that they typically function to specifically convert a first type of system into a second type of system but would not be useful in converting the second type of system to the first. For example, an adapter panel for an attachment module of hook-and-loop system may convert the hook-and-loop attachment module into a MOLLE/PALS attachment module, but not the other way around.

To address these limitations, the disclosed subject matter provides an adapter panel 8 (also referred to as a "strap connection panel") as shown in FIGS. 1-6, which may be used to adapt hook-and-loop systems and MOLLE strap systems in either direction (i.e., from a hook-and-loop system to a MOLLE system and vice versa), rather than from just hook-and-loop to MOLLE or MOLLE to hook-and-loop.

In embodiments, adapter panel 8 may be a planar sheet, including one or more sheet layers, with opposing hook-and-loop surfaces 8A (i.e., front and back planar surfaces), and further comprising one or more slitted cutout(s) 20 configured to receive a flat strap 8B such as a MOLLE strap. In certain embodiments, cutout(s) 20 may comprise at least one linear slit 20A configured to receive a MOLLE strap. In further embodiments, cutout(s) 20 may comprise multiple linear slits 20A, which may be aligned and/or oriented in different directions allowing the cutout to receive a MOLLE strap in different orientations with respect to adapter panel 8. In one embodiment, cutout(s) 20 may comprise cross-axial shapes configured to allow for MOLLE strap integration in both the vertical and horizontal axes of adapter panel 8. In some embodiments, cutout(s) 20 may be stamped with a die cut across the panel.

Figure 1:
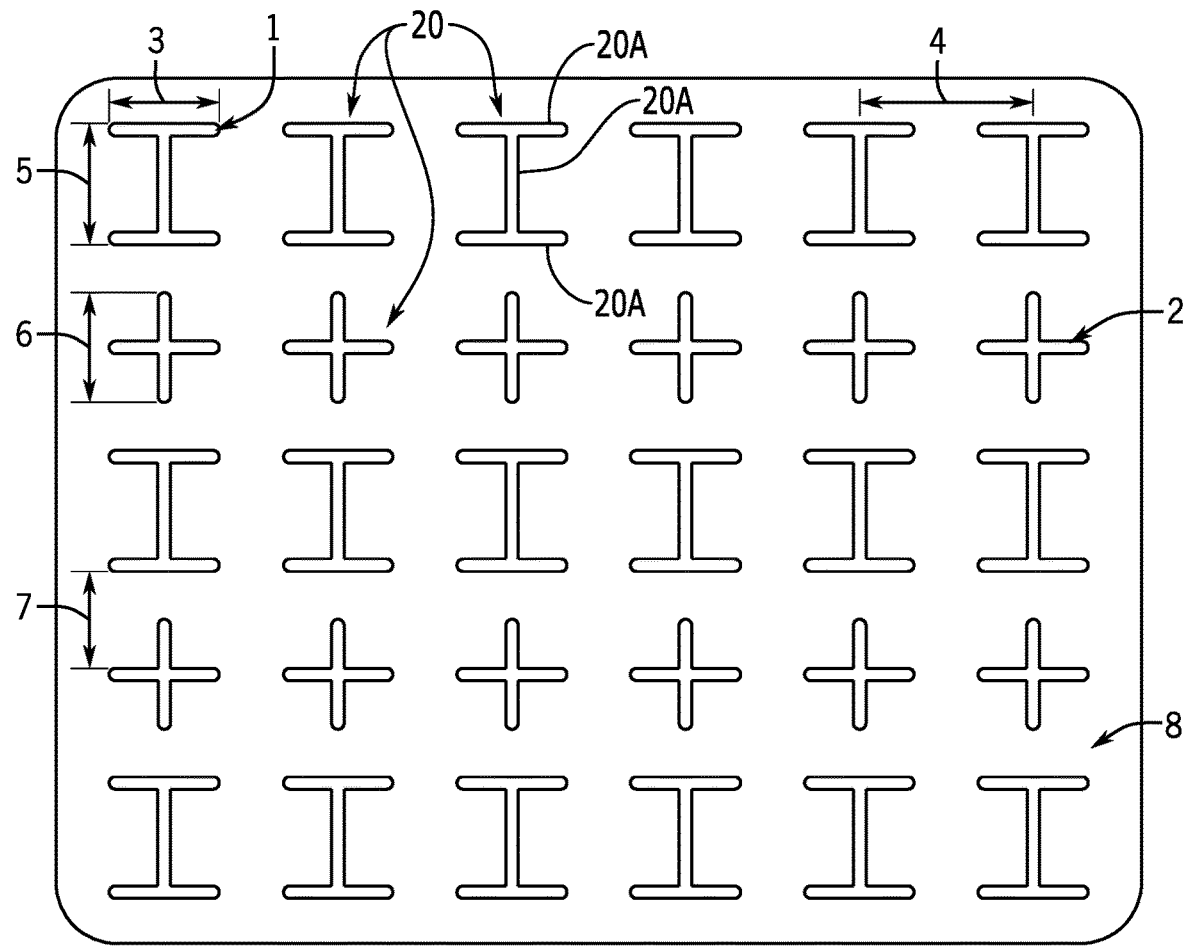
FIG. 1 is a top view of adapter panel for a MOLLE/PALS and hook-and-loop systems, in accordance with certain embodiments.
Figure 2:
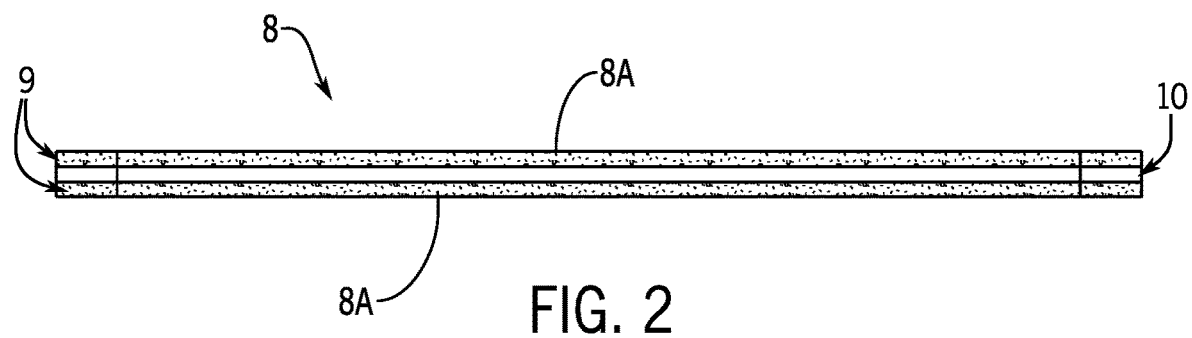
FIG. 2 is a side view thereof, showing the layers of the panel.

In certain embodiments as best depicted in FIG. 2, adapter panel 8 may comprise a stabilizer substrate 10, which is layered between two sheets 9 of hook-and-loop material. The three layers may be adhered together (with the hook-and-loop sheets 9 facing outward, and the stabilizer substrate 10 on an inner side between sheets 9. In certain embodiments, the stabilizer substrate 10 may be made of a rigid material which allows the panel to be used as a stand-alone device. The pattern of cross-axial shapes allows for MOLLE strap integration along both vertical and horizontal axes, rather than in just a single axis of the ladder straps' construction. As such, a user may affix straps at a 90-degree axis to the MOLLE/PALS strap orientation, further adding customization options. In certain embodiments, the shape cutout pattern may include different shapes.

In one embodiment, as shown in the figures, the pattern may comprise two different cutout shapes, with a first cutout shape 1 comprising an "I" shape, and a second cutout shape 2 comprising an "plus" shape. In some embodiments, these shapes may be arranged in alternating rows throughout panel 8 as shown in the figures. Such cross-axial shapes allow both vertical and horizontal strap insertion, making the panel design compatible in both directions. In certain embodiments, the cutouts may be positioned to form a grid that aligns with MOLLE specifications in the primary axis. In further embodiments, the cutouts are shaped and spaced in a manner that covers the entire grid of connection points in a MOLLE strap ladder without gaps or misalignment and without degrading the rigidity of the panel through the loss of material. The design further maximizes the capacity for hook-and-loop surface area, structural stability, and replicates the inherent grid of MOLLE strap hardpoints. This allows for seamless integration of hook-and-loop components to any strap ladder surface and vice versa, for bi-directional adaptation between the two organizational systems.

In one embodiment, panel 8 may be a six by five grid arrangement, wherein the width 3 of each column of cutouts may be about 25 mm; the spacing 4 between columns may be approximately 40 mm; the length 5 of the first shape cutout 1 may be approximately 25 mm; the length 6 of the second shape cutout 2 may be approximately 25 mm; and the length 7 between cutouts in adjacent rows may be approximately 25 mm. It shall be appreciated that the shape of the cutouts and layout arrangement may vary in alternate embodiments.

As such, the pattern of cutout shapes may be optimized for complete compatibility with MOLLE specifications while maintaining enough material to prevent weakening of the physical structure of the rigid stabilizer. The pattern of shapes may map directly to the grid of strap loops used in MOLLE-compatible systems without any gaps or obstructions. The geometry of the shapes adds increased functionality by allowing a user to utilize MOLLE straps in both horizontal and vertical orientations simultaneously, providing greater flexibility when arranging modules within the grid. In certain embodiments, the rigidity of the panel provides the panel with the ability to self-support irrespective of the surface it is adapting. This also allows the panel to be utilized as a standalone element that accepts any MOLLE or hook-and-loop based item simultaneously and on both front and back surfaces of the panel.

In embodiments, different permutations of hook-and-loop materials may be used on the panel to allow for adaptability with any combination of strap, hook-side, and loop-side components. In one embodiment, the panel can be covered on both sides with a material containing the hook component; in another embodiment, both sides may be covered with the loop component; and in the third embodiment, one side may comprise hook material and the other side may comprise loop material. While the most useful variations for adapter use may include at least one layer of a hook material, the double loop embodiment may be best suited for stand-alone use as an organization panel rather than an adapter from one system to another based on the configuration of attachment items and main attachment products which may be available on the market.

Figure 3:
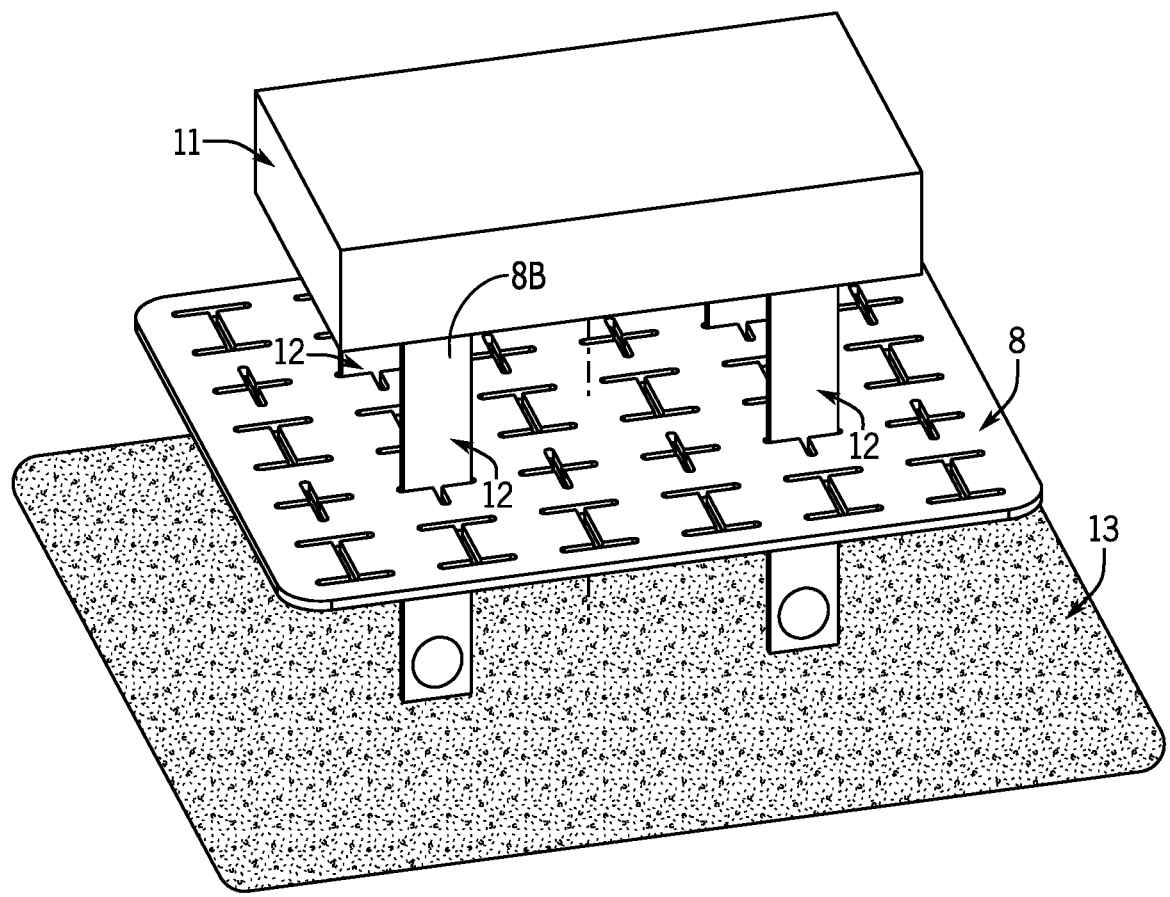
FIG. 3 is a top perspective view showing the adapter panel in use for adapting a MOLLE system module to a hook-and-loop system.
Figure 4:
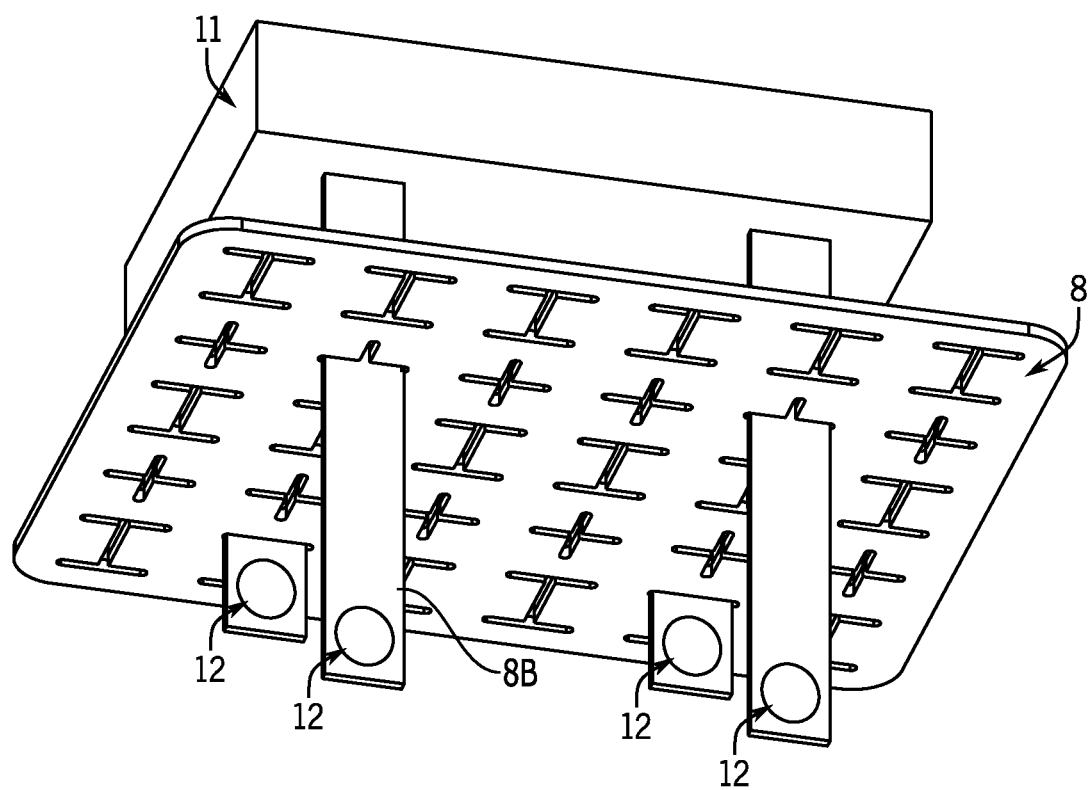
FIG. 4 is a bottom view of FIG. 3.

As best depicted in FIGS. 3 and 4, adapter panel 8 may be used to add hook-and-loop compatibility to a MOLLE strap system, by attaching panel 8 to MOLLE system module 11 via MOLLE system module straps 12 inserted through shape 1 and/or shape 2 of panel 8, wherein the hook-and-loop outer surface 9 enables a hook-and-loop attachment surface 13 to be attached to the MOLLE system module 11. In embodiments, the user may thread any number and/or sizes of MOLLE strap(s) through the panel's cutout shapes and may interweave the strap(s) with the strap ladder grid of the panel, resulting in a hook-and-loop surface connected to the MOLLE grid while maintaining the functionality of the MOLLE grid due to the full grid provided by the cutout pattern.

Figure 5:
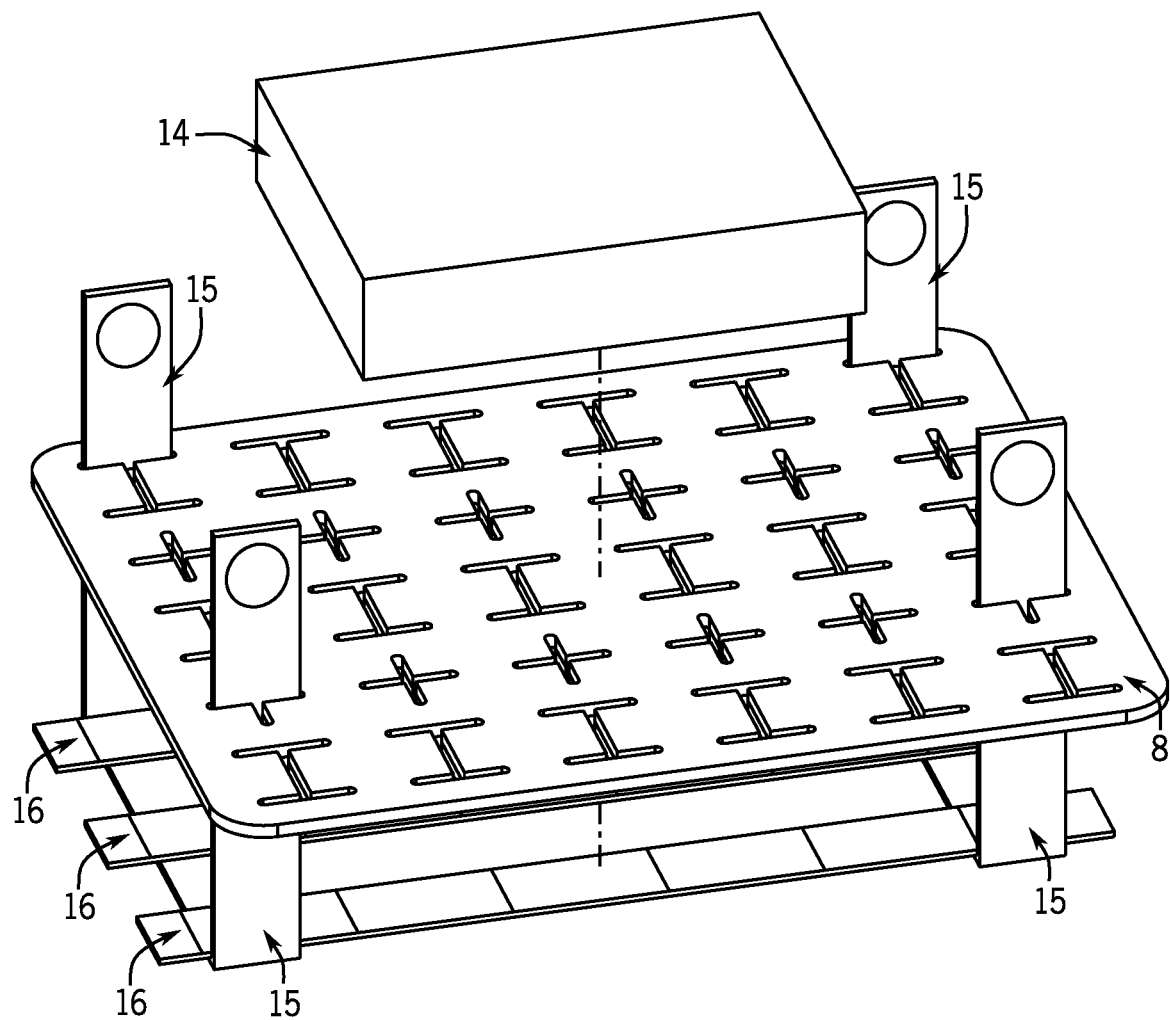
FIG. 5 is a top perspective view showing the adapter panel in use for adapting a hook-and-loop system module to a MOLLE system strap ladder grid.

Additionally, as depicted in FIG. 5, adapter panel 8 may further be used to add the functionality of a MOLLE system strap and ladder grid to a hook-and-loop system module 14, by attaching panel 8 to module 14 via loop-and-hook adherence between the surfaces of module 14 and panel 8, wherein cutout shapes 1 and/or 2 enable attachment of a MOLLE system strap 15 and a MOLLE system strap ladder grid 16. In one embodiment, the user may mount the desired MOLLE attachment item(s) with straps 15 directly to the panel, and then affix the back of the panel to the desired hook-and-loop surface.

Figure 6:
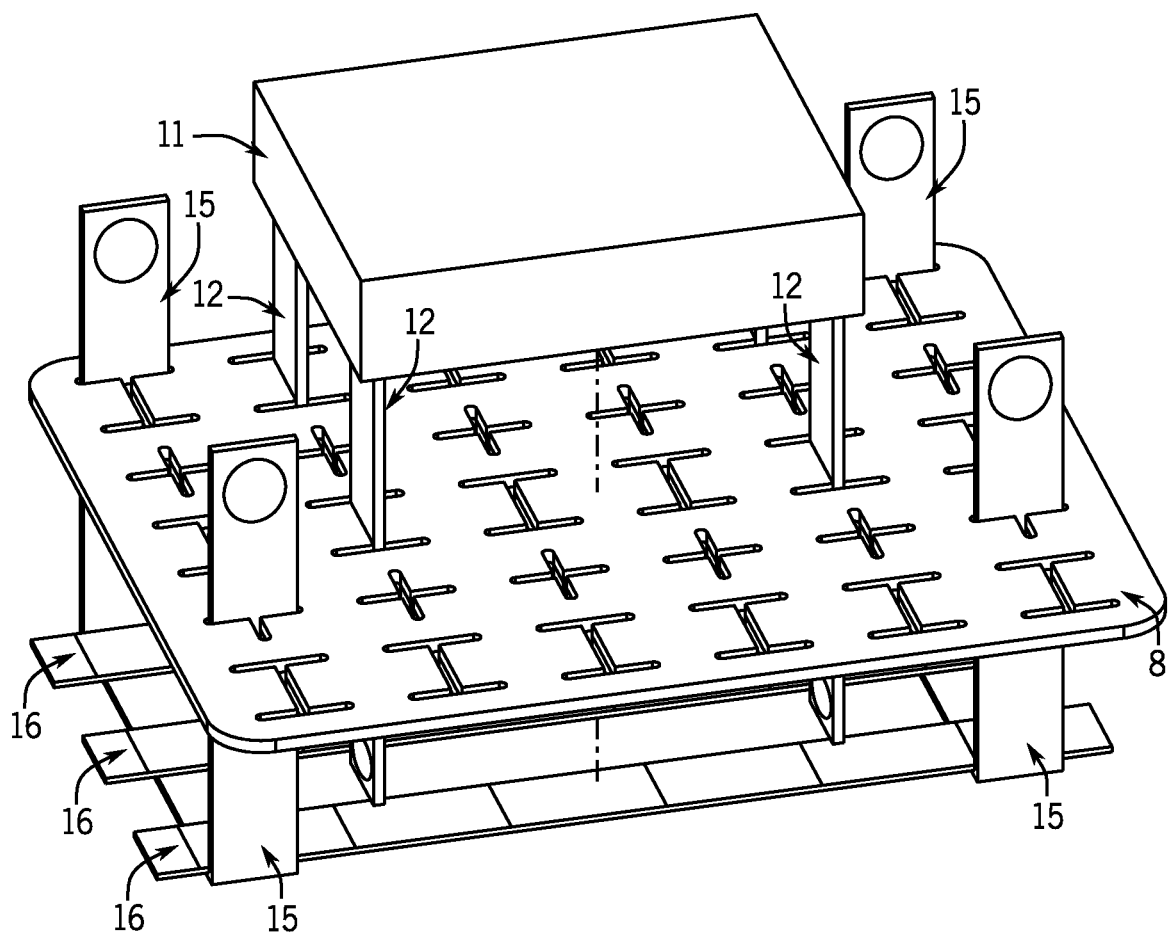
FIG. 6 is a top perspective view showing the adapter panel in use for adapting a MOLLE system module to a MOLLE system strap ladder grid on an axis perpendicular to the MOLLE system strap ladder grid.

Furthermore, adapter panel 8 may be used in adapting a MOLLE system strap ladder grid of a first axis to a MOLLE system strap ladder grid of a second axis perpendicular to the first axis and/or to a MOLLE system which provides the user with an option of using both first and second axes, and the hook and loop attachment (see FIG. 6).

In all of the above-described uses, using panel 8 to adapt from one system to another retains the functionality of both systems, allowing the user to affix attachment item(s) compatible with any system on the same panel simultaneously if desired.

As such, the disclosed subject matter provides a single adapter panel capable of adapting a hook-and-loop systems to MOLLE/PALS systems, and a MOLLE/PALS system into hook-and-loop systems, as well as permitting a vertical and/or horizontal reorientation of the strap ladder grid of the MOLLE/PALS system. This provides the user with the ability to adapt multiple products from many different organizational systems into a single element such as a case, bag, or other carrier. Additionally, adapter panel 8 provides a rigid stabilizer which allows the panel to be used as a stand-alone attachment/organization device without the need for a secondary support surface.

It shall be appreciated that adapter panel 8 can have multiple configurations in different embodiments. In some alternate embodiments, the pattern of shapes may be at a 45 degree or other angle with respect to the panel border (as opposed to the horizontal/vertical orientation shown in the figures). This may enable the grid to hold items at different angle(s) with respect to the panel border. It shall be appreciated that the pattern of shapes may vary in alternate embodiments, for example, the pattern may start with the plus shape, instead of the "I" shape, and/or include other cutout shapes, such as an "X" shape, a "+" shape, an "H" shape, a "T" shape, etc. In some other alternate embodiments, a single shape may be used, or more than two shapes may be used. In further embodiments, the shapes may be in a non-alternating pattern, in a 2-2 alternating pattern, 1-2 pattern, etc.

It shall be appreciated that the disclosed device and system can have multiple configurations in different embodiments. It shall be appreciated that the components of the adapter panel described in several embodiments herein may comprise any alternative known materials in the field and be of any size and/or dimensions, and that the panel can be made in a range of different sizes to accommodate larger or smaller surfaces. It shall be appreciated that the components of adapter panel described herein may be manufactured and assembled using any known techniques in the field.

It shall be understood that the orientation or positional relationship indicated by terms such as "upper", "lower", "front", "rear", "left", "right", "top", "bottom", "inside", "outside" is based on the orientation or positional relationship shown in the accompanying drawings, which is only for convenience and simplification of describing the disclosed subject matter, rather than indicating or implying that the indicated device or element must have a specific orientation or are constructed and operated in a specific orientation, and therefore should not be construed as a limitation of the present invention.

As used herein, the articles "a" and "an" are intended to include one or more items and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A strap connection panel, comprising:
   a planar sheet including at least one sheet layer and having a front planar surface and a back planar surface opposite the front planar surface,
   wherein the front planar surface and the back planar surface comprise hook-and-loop material, and
   wherein the planar sheet includes at least one cutout configured for receiving a flat strap through the planar sheet,
   wherein the planar sheet comprises a stabilizer substrate layered between two sheets of hook-and-loop material, the hook-and-loop material forming the front planar surface and the back planar surface of the planar sheet.

2. The strap connection panel of claim 1, wherein the stabilizer substrate comprises a rigid material.

3. The strap connection panel of claim 1, wherein the cutout comprises at least one linear slit.

4. The strap connection panel of claim 3, the cutout comprising multiple linear slits oriented in different directions and configured to allow the flat strap to be received in different alternate orientations with respect to the strap connection panel.

5. The strap connection panel of claim 4, the cutout comprising cross-axial linear slits.

6. The strap connection panel of claim 3, wherein the planar sheet comprises multiple cutouts.

7. The strap connection panel of claim 6, wherein the multiple cutouts have at least 2 different shapes.

8. The strap connection panel of claim 6, wherein the multiple cutouts include at least one row and/or at least one column of multiple linear slits aligned in a common direction.

9. The strap connection panel of claim 6, wherein the multiple cutouts include multiple vertical cutouts which are aligned with respect to one another, and multiple horizontal cutouts which are aligned with respect to one another.

10. The strap connection panel of claim 1, wherein the strap connection panel is an adapter panel configured to adapt a hook-and-loop system to a MOLLE strap system and to adapt a MOLLE strap system to a hook-and-loop system.

11. The strap connection panel of claim 1, wherein the front planar surface comprises a hook component of the hook-and-loop material, and the back planar surface comprises a loop component of the hook-and-loop material.

12. The strap connection panel of claim 1, wherein the front planar surface and the back planar surface both comprise a hook component of the hook-and-loop material, or wherein the front planar surface and the back planar surface both comprise a loop component of the hook-and-loop material.

13. The strap connection panel of claim 1, wherein the planar sheet is rigid.

\* \* \* \* \*